United States Patent [19]
Morse

[11] Patent Number: 5,835,585
[45] Date of Patent: *Nov. 10, 1998

[54] TELEPHONE ON-HOOK AND OFF-HOOK SENSING SYSTEMS

[75] Inventor: Alan P. Morse, Sylmar, Calif.

[73] Assignee: Dynametric, Inc., Monrovia, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 657,789

[22] Filed: May 31, 1996

Related U.S. Application Data

[60] Provisional application No. 60/003,562, Sep. 11, 1995.

[51] Int. Cl.$^6$ .................................................. H04M 1/00
[52] U.S. Cl. ............................................ 379/424; 379/447
[58] Field of Search ................................. 379/423, 424, 379/425, 447, 428, 422

[56] References Cited

U.S. PATENT DOCUMENTS

| 2,686,844 | 8/1954 | Brewer | 379/424 |
|---|---|---|---|
| 3,413,423 | 11/1968 | Stevko | 379/424 |
| 4,847,900 | 7/1989 | Wakim | 379/424 |

OTHER PUBLICATIONS

Optoelectronic Data Book 1991/1992 by Sharp Electronics Corporation pp. 119 to 121, pp. 964 to 965, Aug. 1988.

Relay Catalog of Omron Electronics, Inc. (1992) pp. 85 to 88

Photograph, Apr. 1996, of AT&T telephone apparatus base 3 sheets.

*Primary Examiner*—Jack Chiang
*Attorney, Agent, or Firm*—Benoit Law Corporation

[57] ABSTRACT

Hook conditions of a handset of a telephone apparatus which includes a telephone apparatus base having an inside and an outside are sensed by providing a beam of radiation outside of that telephone apparatus base. The handset is placed in that beam of radiation outside the telephone apparatus base in an on-hook condition of that handset on the telephone apparatus base. An off-hook condition of the handset is signaled by removing that handset from that beam of radiation while removing such handset from the telephone apparatus base. A method of preventing eavesdropping through microphone and earphone of a handset of a telephone apparatus opens a circuit of either the microphone or the earphone and short-circuits either the earphone or the microphone, respectively while the handset is on-hook on a base of that telephone.

20 Claims, 3 Drawing Sheets

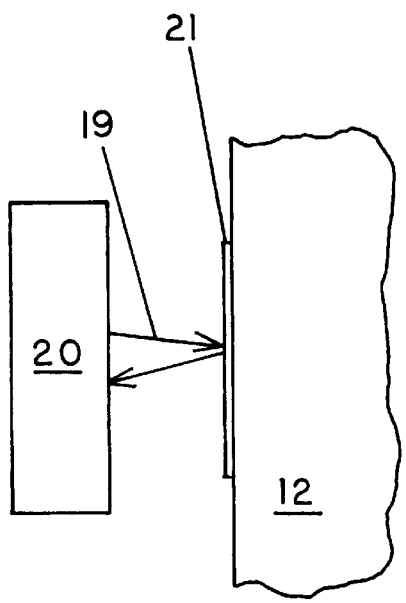
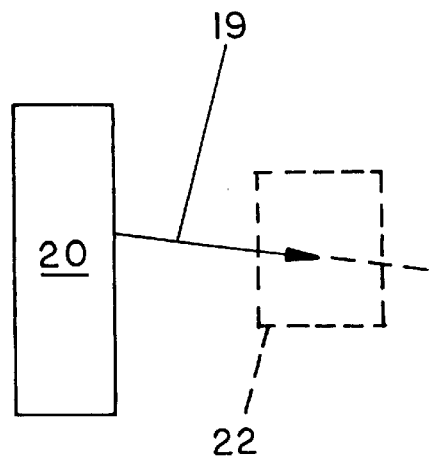
FIG. 2  FIG. 3
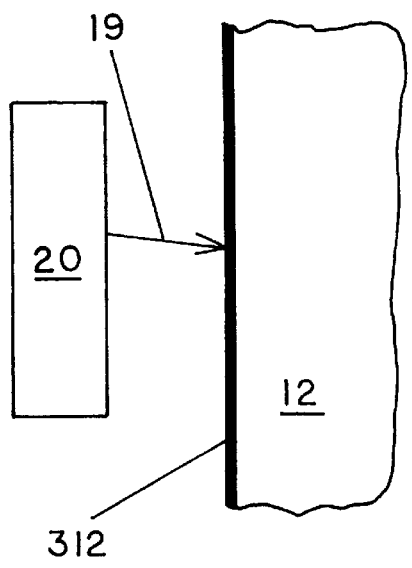
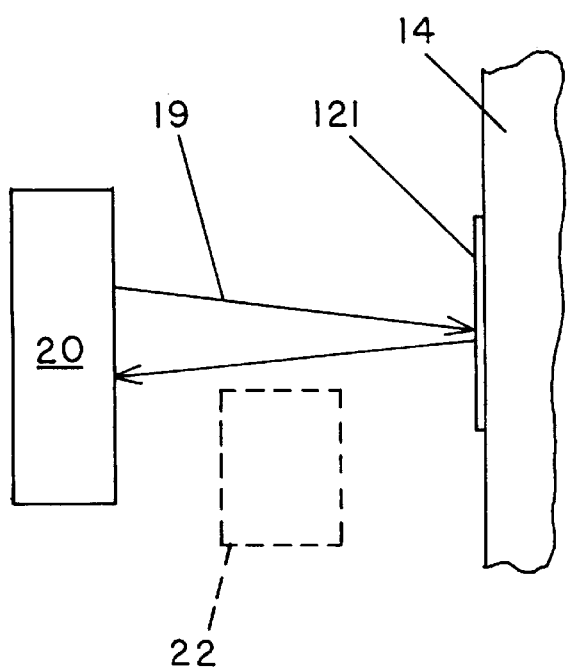
FIG. 4  FIG. 5

TELEPHONE ON-HOOK AND OFF-HOOK SENSING SYSTEMS

CROSS-REFERENCE TO PRIORITY APPLICATION

This is a regular patent application claiming priority from Provisional Application Ser. No. 60/003,562, filed by the subject inventor on Sep. 11, 1995, and assigned to Dynametric, Inc. by recorded assignment executed Oct. 23, 1995.

FIELD OF INVENTION

The subject invention relates to telephone apparatus and, more specifically, to systems for sensing telephone handset on-hook and off-hook conditions.

BACKGROUND

Sensing on-hook and off-hook conditions in telephone apparatus has become a delicate problem, since there now often is no detectable electrical change between the on-hook and off-hook states in modern telephone apparatus. Also, electrical sensing circuits that invade the circuitry of the telephone apparatus may affect the functioning of the apparatus itself.

Accordingly, a prior-art hook sensing apparatus provides an infrared transmitter and an infrared sensor inside the housing of a telephone apparatus. That prior-art apparatus inserts an opaque piece or blind between such infrared transmitter and receiver to interrupt the infrared beam therebetween. In that prior-art apparatus, the opaque piece inside the telephone apparatus is coupled to the hook of the telephone apparatus, whereby the beam is selectively interrupted and restored to signal or indicate on-hook and off-hook conditions of a handset selectively placed onto and removed from such telephone apparatus base.

In practice, such prior-art approach has its limitations, as its utility is practically restricted to provision of such hook condition sensor during the original manufacture of telephone sets. Retrofitting existing apparatus with such prior-art hook condition sensing systems is practically impossible under such circumstances.

SUMMARY OF THE INVENTION

The subject invention provides hook condition sensing systems that avoid such problems and enable various useful functions in a novel way.

These include:

Providing a signal distinguishing between on-hook and off-hook conditions. P1 Providing an output signal to turn on recording devices when the phone is in use (off hook).

Connecting an audio output when the phone is in use.

Turning "on" and "off" recording alert "beep" tones, which insure that the parties are aware that the conversation is being recorded, as required by many State laws.

Disconnecting the handset when not in use (to prevent eavesdropping).

In this respect, spies in government operations, law enforcement and industry have found out that the microphone in many digital telephone apparatus remains accessible through the telephone wiring, even if the handset is in its cradle, on-hook. Others have found that the earphone can be used as a dynamic microphone for eavesdropping when the phone is on-hook. These people thus have been able to listen to what is being said in rooms where such telephones are located, even during the long periods of time during which such telephones are on-hook, that is, are not in use.

The subject invention effectively thwarts such eavesdroppers and spies, even if the phones in question were not originally manufactured to overcome such invasion of privacy and security problems.

From one aspect thereof, the invention resides in a method of sensing a hook condition of a handset of a telephone apparatus which includes a telephone apparatus base having an inside and an outside and conventional on-hook/off-hook circuitry inside said telephone apparatus, comprising, in combination, retrofitting said telephone apparatus with a transmitter of a beam of radiation outside of that telephone apparatus, connecting a handset to the transmitter, connecting a transmitter cord of the transmitter to the telephone apparatus, placing the handset in that beam of radiation outside the telephone apparatus base in an on-hook condition of that handset on the telephone apparatus base, and signaling an off-hook condition of the handset by removing that handset from that beam of radiation while removing such handset from the telephone apparatus base.

In combination with that aspect thereof, the invention also resides in a method for telephone apparatus wherein said handset cord has a plug and said telephone apparatus has a jack for receiving said plug, said method including method for telephone apparatus wherein said handset has a cord having a plug and said telephone apparatus has a jack for receiving and plug; said method including of the handset of the telephone apparatus, by opening a circuit of one of such microphone and earphone between said plug of the cord of said handset and said jack of the telephone apparatus and short-circuiting the other of such microphone and earphone between said plug of the cord of said handset and said jack of the telephone apparatus while the handset is on-hook on a base of that telephone apparatus.

From a related aspect thereof, the invention resides in apparatus for sensing a hook condition of a handset of a telephone apparatus including a telephone apparatus base having an inside and an outside and conventional on-hook/off-hook circuitry inside said telephone apparatus, comprising, in combination, a transmitter of a beam of radiation retrofit to said telephone apparatus outside of said telephone apparatus apart from said conventional on-hook/off-hook circuitry and apart from said handset, a sensor of that beam of radiation retrofit to said telephone apparatus outside of that telephone apparatus, a handset cord of the handset being connected to the transmitter, a transmitter cord of the transmitter being connected to the telephone apparatus, such handset being in that beam of radiation between the transmitter and the sensor outside of the telephone apparatus in an on-hook condition of that handset on that telephone apparatus base, and such handset being away from that beam of radiation between the transmitter and the receiver in an off-hook condition of that handset.

BRIEF DESCRIPTION OF DRAWING

The subject invention and its various aspects and objects will become more readily apparent from the following detailed description of preferred embodiments thereof, illustrated by way of example in the accompanying drawings which also constitute a written description of the invention, wherein like reference numerals designate like or equivalent parts, and in which:

FIG. 2 is a enlarged somewhat diagrammatic detail view of components as seen in a direction 2—2 in FIG. 1 illustrating a first embodiment of the invention;

FIG. 3 is a view similar to FIG. 2 but showing an off-hook condition with the handset removed;

FIG. 4 is a view similar to FIG. 2 showing an alternative embodiment of the invention;

FIG. 5 is a view corresponding to FIG. 4 illustrating an off-hook condition sensing operation according to the alternative embodiment of the invention.

DESCRIPTION OF PREFERRED EMBODIMENTS

Figure 1:
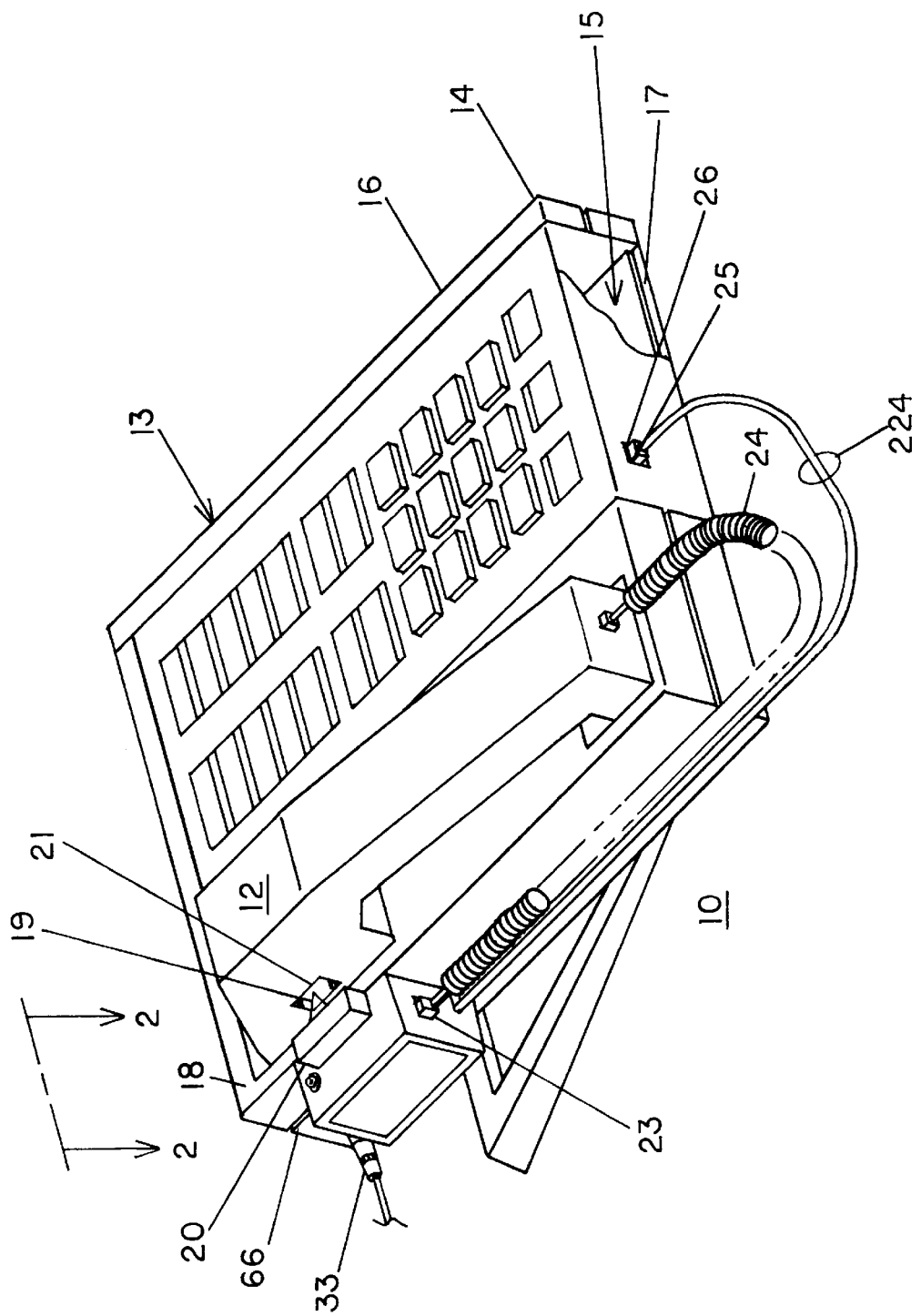
FIG. 1 is a perspective view of a telephone apparatus equipped with a hook condition sensor according to an embodiment of the invention.

The drawings in particular show methods and apparatus 10 for sensing a hook condition of a handset 12 of a telephone apparatus 13 including a telephone apparatus base 14 which has an inside 15 enclosed and concealed by a housing 16, and which has an outside 18 visible in FIG. 1.

In this respect, what is referred herein as "base" may actually be the housing 16 on a baseplate 17 of the telephone apparatus. However, in order to distinguish between the handset and the remainder of the telephone apparatus, the term "base" is used herein to designate the part of the telephone apparatus, including the housing 16, which serves as a base 14 of or for the handset 12.

A preferred embodiment of the invention provides a beam of radiation 19 outside of the telephone apparatus base 14. This is just the opposite of the above mentioned prior-art apparatus (not shown) in which a beam of radiation, such as an infrared beam, is provided inside the telephone apparatus housing 16 or base 14 to be interrupted by an opaque blind coupled to the handset hook.

In the illustrated preferred embodiments of the invention, the handset 12 is placed in the beam of radiation 19 outside 18 of the telephone apparatus base 14 in an on-hook condition of that handset on that telephone apparatus base. Conversely signaling of an off-hook condition of the handset 12 is effected by removing such handset from the beam of radiation 19 while removing that handset from the telephone apparatus base 14.

According to the preferred embodiment shown in FIGS. 1 to 3, provision of the beam of radiation 19 includes reflection of that beam of radiation from the handset 12 while such handset is in an on-hook condition on the telephone apparatus base 14, such as shown in FIGS. 1 and 2. A reflector 21 may be provided on the handset 12 for that purpose.

The off-hook condition of the handset 12 is then signaled by interruption of the reflection of the beam of radiation 19 by the handset by removal of that handset from the telephone apparatus base 14, such as shown in FIG. 3, whereby the reflector 21 is also removed from the reach of the beam of radiation 19 transmitter.

In the embodiment shown in FIGS. 4 and 5, the handset 12 interrupts the beam of radiation 19 in its on-hook condition on the telephone apparatus base 14, illustrated in FIG. 4. Conversely, the off-hook condition is signaled by restoring the beam of radiation 19 while removing the handset 12 from the telephone apparatus base 14, such as illustrated in FIG. 5.

In the illustrated embodiments of the invention, provision of the beam of radiation 19 includes reflection of that beam of radiation from at least one of the telephone apparatus base 14 and the handset 12 outside of such telephone apparatus base 14 and such handset 12. This may include providing on one of the telephone apparatus base 14 and the handset 12 a reflector 21 or 121 for the beam of radiation 19. Such reflector may be provided by manufacturing at least part of the telephone apparatus base 14 or handset 12 of a shiny, infrared reflective material, or by retrofitting a reflector onto the telephone apparatus base 14 or onto the handset 12, such as shown in FIGS. 1, 2 and 5.

According to the embodiment shown in FIG. 4 and 5, provision of the beam of radiation 19 includes reflection of that beam of radiation from the telephone apparatus base 14 outside of that telephone apparatus base, such as by providing on the telephone apparatus base 14 a reflector 121 for the beam of radiation 19.

Reflection of the beam of radiation 19 is then interrupted with the handset 12 in an on-hook condition of that handset on the telephone apparatus base 14, such as shown in FIG. 4. The outside of the handset 12 may in that case be manufactured or otherwise provided with an infrared light-absorbent surface or coating 312 in the region of the beam 19, so that any reflection of the beam 19 is minimal from the handset 12 in the embodiment shown in FIG. 4.

The off-hook condition of the handset 12 is signaled by restoration of the reflection of the beam of radiation 19 from the telephone apparatus base 14 by removing the handset 12 from the beam of radiation 19 while removing the handset from the telephone apparatus base 14, whereby the beam can again be reflected, such as shown in FIG. 5.

Figure 6:
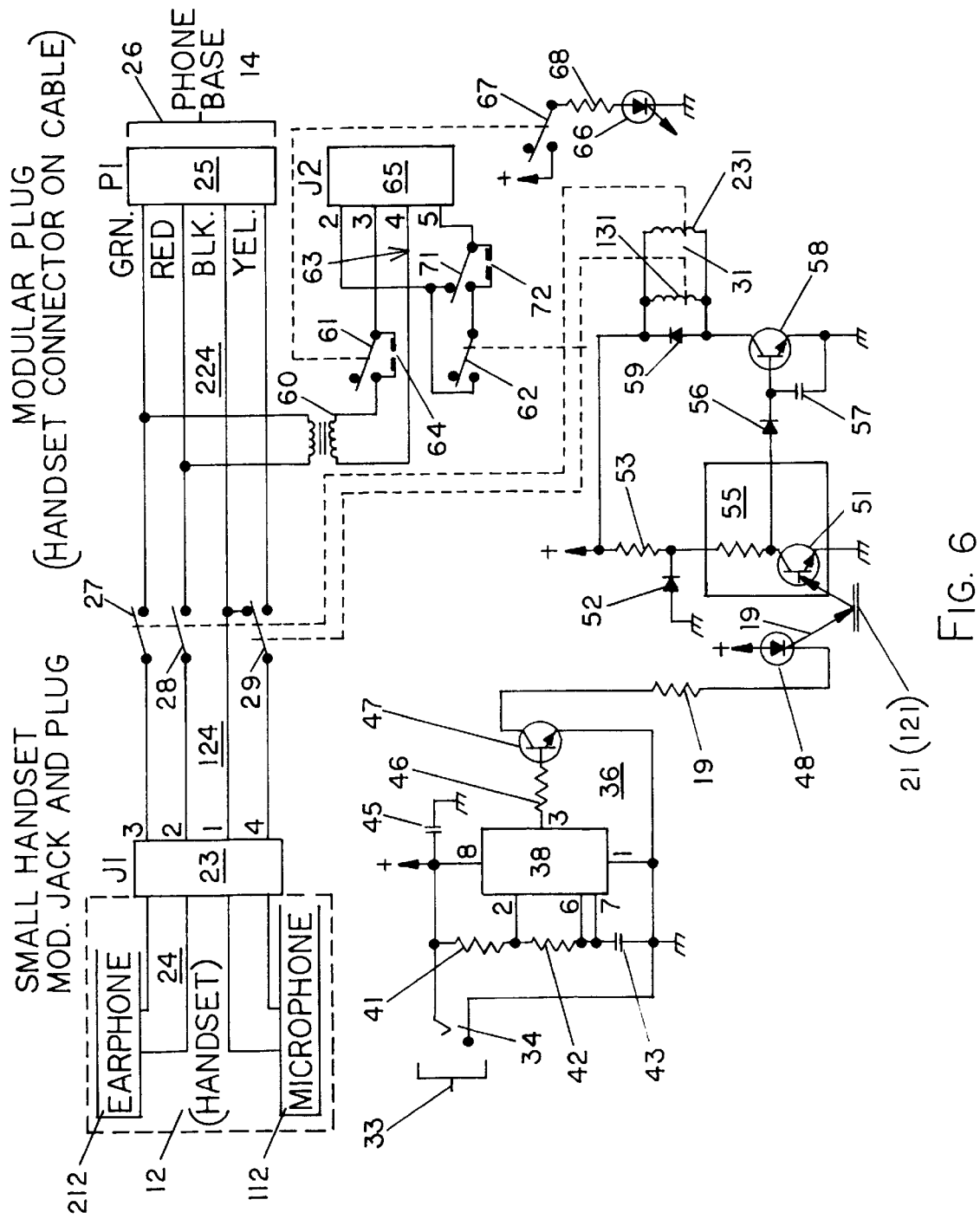
FIG. 6 is a circuit diagram of a combination of telephone handset circuit switcher, radiation emitter-sensor, beep signal generator and injector and audio output circuit and recording controller, according to embodiments of the invention.

Apparatus according to the invention for sensing a hook condition of a handset 12 of a telephone apparatus 13 including a telephone apparatus base 14 having an inside 15 and an outside 18, comprise a transmitter 20 of a beam of radiation 19 outside of the telephone apparatus base, and a sensor (e.g. 51; FIG. 6) of such beam of radiation 19 also outside of the telephone apparatus base 14. According to embodiments of the invention, a reflector 21 or 121 for the beam of radiation 19 is between the transmitter and the sensor on one of the telephone apparatus base 14 and the handset 12.

According to the embodiment shown in FIGS. 1 to 3, a reflector 21 of the beam of radiation 19 is on the handset 12 between the transmitter and the sensor, so to speak. Such reflector of the beam of radiation 19 preferably is adapted on the handset 12 to reflect such beam of radiation 19 from the transmitter 20 or 48 to the sensor 51 in an on-hook condition of the handset 12 on the telephone apparatus base 14, such as shown in FIGS. 1 and 2.

Conversely, the reflector 21 on the handset 12 is out of the beam of radiation 19 from the transmitter in an off-hook condition of such handset 12 from the telephone apparatus base 14, such as shown in FIG. 3.

The beam of radiation 19 may be any suitable beam of radiant energy. Preferably, however, the beam of radiation 19 is a beam of infrared radiation, with the transmitter 20 being an infrared beam transmitter 48 and the sensor being on infrared beam sensor 51.

According to the alternative embodiment shown in FIGS. 4 to 5, the handset 12 is in the beam of radiation 19 between the transmitter and the sensor outside of the telephone apparatus base 14 in an on-hook condition of that handset 12 on that telephone apparatus base 14, such as shown in FIG. 4. Conversely, as shown in FIG. 5, the handset 12 is away from the beam of radiation 19 between the transmitter 20 or 48 and the receiver 51, so to speak, in an off-hook condition of that handset 12.

According to FIGS. 4 and 5, the reflector 121 of the beam of radiation 19 is on the telephone apparatus base 14 between the transmitter 48 and the sensor 51, so to speak. The handset 12 then may be between the reflector 121 and at least one of the transmitter 48 and the sensor 51 in an on-hook condition of that handset 12 on the telephone apparatus base 14, such as shown in FIG. 4.

Conversely, the handset 12 is remote from the reflector and from the beam of radiation 19 between the transmitter and the sensor in an off-hook condition of that handset 12, such as shown in FIG. 5.

A dotted box 22 in FIGS. 3 and 5 outlines a modern type of telephone handset hook which, however, may take any other form. The dotted box 22 may in fact symbolize the entire on-hook/off-hook circuitry (not shown) of the telephone set 10. Unlike prior-art approaches, the subject invention and its operation do not touch or affect such conventional circuitry.

Circuits for implementing embodiments of the invention are shown in FIG. 6 by way of example.

The diagram of FIG. 6 shows a sensing circuit and associated circuitry for performing functions made possible by the detector according to embodiments of the invention. This apparatus:

1. Provides a signal distinguishing between on-hook and off-hook conditions.
2. Disconnects the handset 12 between calls—preventing eavesdropping.
3. Provides closure of a switch 62 to signal a recording device to begin recording when the phone or handset 12 is off the hook.

In the upper left is a schematic of the handset 12, including a microphone 112 and an earphone 212. The wiring shown is for a standard type handset. Other handset wiring schemes are sufficiently similar for present purposes. To the right is a small handset modular jack and plug combination 23. An end of the "coil cord" 24 of the handset 12 connects here.

On the right side at about the same height is a standard modular plug 25 that receives a cable 224 shown in FIGS. 1 and 6 as inserted into the standard telephone base modular plug 26 normally provided for the handset cord plug 23, but used differently in the subject embodiment.

The four wires of the handset circuit 124–224 between modular jacks and plugs 23 and 25 are labeled 3, 2, 1 & 4, top to bottom, for their corresponding modular jack or J1 pin numbers. The corresponding wire colors are GREEN, RED, BLACK, and YELLOW, denoted GRN, RED, BLK, and YEL, respectively. Between modular jacks and plugs 23 and 25 are the contacts 27, 28 and 29 of relay 31 or relays 131 and 231. These contacts are configured such that contacts 27 and 28 open the two earphone wires (3-GRN & 2-RED), while contact 29 simultaneously opens the 4-YEL connection and short-circuits pins 1 and 4 of the 1-BLK & 4-YEL circuit of the modular plug and jack 23.

This combination of opening the earphone 212 circuit and shorting the microphone 112 was found to be the best for eliminating the possibility of anyone listening in or eavesdropping through the handset while it is on-hook. We have found that it is otherwise possible, in many modern telephone systems, for someone to eavesdrop on private conversations in rooms where phones are located, even while the phone is hung up. We have discovered that, in some popular phone systems at least three wires needed to be disconnected to ensure that no audio leakage was detectable. The two earphone wires (modular jack 23 pin 3 to GRN and pin 2 to RED) are opened because an earphone speaker can also operate as a crude microphone (dynamic microphone). Shorting the microphone (modular jack 23 pin 1 to pin 4) while simultaneously disconnecting one side of it provides an extra level of security, preventing any sound signal from being generated or transmitted, without affecting the telephone circuitry or otherwise endangering normal operation of the phone.

Accordingly, the currently disclosed aspect of the invention broadly resides in methods and apparatus of preventing eavesdropping through microphone 112 and earphone 212 of a telephone apparatus 10.

This aspect of the invention opens a circuit of one of (a) said microphone and (b) said earphone, and short-circuits the other of said (a) microphone and (b) said earphone, such as shown at 27, 28 and 29 in FIG. 6, while the handset 12 is on-hook on a base 14 of the telephone apparatus 10, such as shown in FIG. 1, for example.

Preferably, the circuit of the mentioned other of said (a) microphone 112 and (b) said earphone 212 is opened during said short-circuiting.

According to the illustrated preferred embodiment of the invention, the above mentioned one of (a) said microphone and (b) said earphone is the earphone 212, while the above mentioned other of (a) said microphone and (b) said earphone is the microphone 112, such as shown in FIG. 6.

Power for all active positions of the apparatus under consideration may be supplied through a cable 33, such as shown in FIG. 1, and input jack 34, such as shown in FIG. 6. By way of example, a 6 Volt DC power cube (not shown) may be used for this purpose.

The infrared emitter circuit 36 is energized from the power jack 34 and includes a modulation oscillator circuit 37 centered on a timer IC 38, which may be of the well-known type 7555. This provides a oscillation and drive current needed by the optical detector device to eliminate false detections. Resistors 41 and 42 and capacitor 43 set the oscillator frequency. By way of example, we found an oscillation frequency of 38 kHz of the infrared beam 19 to eliminate false responses of the photodetector to extraneous infrared light sources. A capacitor 45 acts as a bypass capacitor improving the stability and noise immunity of the timer 38.

The output of that timer 38 is fed through a resistor 46 to a transistor 47 that drives a radiation emitter, such as an infrared LED 48, through a resistor 49, which sets the brightness of beam 19. The optimum brightness may be found by experiment for any given application. A suitable infrared light source 48 includes by way of example an infrared light emitting diode of the Type GL527V or GL528V, such as shown in the Optoelectronic Data Book 1991/1992 by Sharp Electronics Corporation© Aug 88, page 119 to 121.

The same Data Book shows a corresponding sensor for remote control, Type IS1U60 on pages 964 and 965. This or another suitable radiation receiver, sensor or photodiode 51 receives or senses the reflected or transmitted beam 19. A zener diode 52 in combination with a resistor 53 limits the supply voltage to the optical detector 51, such as to a 5-VDC supply.

The optical detector circuit 55 may include components of the type shown on the above mentioned Data Book page 965, including the photodiode 51, amplifiers, a bandpass filter (centered at the frequency imposed by timer 38, such as at 38 kHz), an integrator, a comparator and an output driver, which may all be standard components. This allows the detection circuit 55 to produce a digital low output only when reflected infrared light 19 modulated at 38 kHz strikes the sensitive surface of its photodiode 51.

The output of that circuit 55 is rectified and filtered through diode 56 and capacitor 57 to prevent relay chatter, and is applied to the base of a relay drive transistor 58 which drives relay coils 131 and 231 of the relay 31. Diode 59 suppresses noise when the relay coils are switched.

The relay 31 actuates the above mentioned contacts 27, 28 and 29 of the headphone wiring 24 at 124, and a further switch 62 of an output switching circuit 63. The circuitry shown in FIG. 6 may be adapted to either embodiment of the invention so far disclosed.

In this respect, the solidly illustrated position of relay contacts 27, 28, 29 and 61 means that the phone 10 or handset 12 is in the on-hook condition shown in FIGS. 1, 2 and 4.

In that case, the relay 31 may be or remain deenergized while a reflected beam 19 is received by the sensor 51, such as in FIGS. 1 and 2. Conversely, the switches 27, 28, 29, 62 are closed, such as by energization of the relay 31, in response to non-reflection of that beam 19 upon removal of the handset 12 (off-hook), such as in FIG. 3.

On the other hand, in the embodiment of FIGS. 4 and 5, the relay contacts 27, 28, 29 and 62 are open when no reflected beam 19 is received, such as in FIG. 4 when the handset is on-hook. Conversely, the relay contacts 27, 28, 29 and 62 are closed when the beam 19 is reflected in the absence of the handset 12 (off-hook), such as in the embodiment of FIG. 5.

Of course, these variations, once known, can readily be implemented. By way of example, a suitable relay 31 may be an Omron Model G6H as shown in the Relay Catalog of Omron Electronics, Inc. (1992), pages 85 to 88. Two such relays may, for instance, be used at 131 and 231, with relay 131 actuating the switches 29 and 62, and relay 231 actuating switches 27 and 28. However, other relays may be used to implement the normally open and/or normally closed contacts for the embodiments shown.

The output switching circuit 63 includes another switch 61 that may, for instance, be manually actuated or optionally be bypassed by a jumper 64. The switch 61, when closed, connects such audio output to a modular jack 65, such as for recording purposes.

The output switching circuit may, for instance, be used to provide an audio signal of phone conversations, such as for recording purposes. A transformer 60 connects such audio output to the switching circuit 63.

An LED 66 or other signal lamp shown in FIGS. 1 and 6 indicates when the audio output is being recorded or is at least ready for recording. The LED 66 is energized from a power supply via switch 67 and resistor 68 when the switch 61, with which it is ganged, is closed.

Conversely, the switches 61 and 67, when opened, disconnect and thereby extinguish the signal LED 66. The switch 61, when opened, also disconnects the audio output from modular jack 65, unless the jumper 64 is closed. Jumper 64 disables switch 61 if connected.

A further switch 71 has three positions, such as RUN, OFF and AUTO. They function as follows:

RUN—Shorts pins 2 and 5 of modular jack 65, thereby allowing a recorder to run normally;

OFF—Opens pins 2 and 5 of modular jack 65, disabling recorder functions;

AUTO—Connects a normally open contact 62 of relay 31 across pins 2 and 5 of modular jack 65, thereby allowing the recorder to run only when a handset off-hook condition is detected.

The AUTO connection of switch 71 may be shunted by a jumper 72.

One further advantage of the circuitry herein disclosed is that it enables the designer to compel the user of the phone 10 to record all conversations.

In particular, since the earphone and microphone muting contacts 27, 28, 29 and recording contact 62 are interlocked, so to speak, via relay 31 or relays 131 and 132, conversations are recorded whenever the handset 12 is off-hook.

This is important in many applications, including, for instance, the insurance and health care industry that relies on recorded statements by policy holders or claimants and insurance or health care agents, and in other fields where personnel is being supervised as to their conversations with customers or clients.

As seen from FIG. 6 and also from FIG. 1, the beam of radiation 19 and the beam transmitter and receiver unit at 20 with associated circuitry are provided without invading either the telephone apparatus 13 nor the handset and their regular telephone circuitry. The beam transmitter and receiver unit at 20 or the transmitter 20 or 48 and the receiver or optical detector or sensor 51 or 55 are located on and attached to the telephone apparatus outside of the telephone apparatus base and the handset.

Pursuant to legal requirements in many jurisdictions, beep tones may be injected into the telephone circuit, so that all parties to the conversation are made aware that they are being recorded. However, no circuitry has been shown for this purpose, since such beep tone generating and injecting circuitry is old as such and does not form part of this invention.

This extensive disclosure will render apparent or suggest to those skilled in the art various modifications and variations within the spirit and scope of the invention.

I claim:

1. A method of sensing a hook condition of a handset of a telephone apparatus including a telephone apparatus base having an inside and an outside, and conventional on-hook/off-hook circuitry inside said telephone apparatus, comprising in combination:

retrofitting said telephone apparatus with a transmitter of a beam of radiation outside of said telephone apparatus;

connecting a handset cord of the handset to the transmitter;

connecting a transmitter cord of the transmitter to the telephone apparatus;

placing said handset in said beam of radiation outside of said telephone apparatus base in an on-hook condition of said handset on said telephone apparatus base; and signaling an off-hook condition of said handset by removing said handset from said beam of radiation while removing said handset from said telephone apparatus base.

2. A method as in claim 1, wherein:

said handset interrupts said beam of radiation in said on-hook condition on said telephone apparatus base; and said off-hook condition is signaled by restoring said beam of radiation while removing said handset from said telephone apparatus base.

3. A method as in claim 1, wherein:

provision of said beam of radiation includes reflection of said beam of radiation from at least one of said telephone apparatus base and said handset outside of said telephone apparatus base and said handset.

4. A method as in claim 3, wherein:

said reflection includes retrofitting said one of said telephone apparatus base and said handset with a reflector for said beam of radiation.

5. A method as in claim 1, wherein:

provision of said beam of radiation includes reflection of said beam of radiation from said telephone apparatus base outside of said telephone apparatus base;

reflection of said beam of radiation is interrupted with said handset in an on-hook condition of said handset on said telephone apparatus base; and said off-hook condition of said handset is signaled by restoration of said reflection of said beam of radiation from said telephone apparatus base by removing said handset from said beam of radiation while removing said handset from said telephone apparatus base.

6. A method as in claim 5, wherein:

said reflection includes retrofitting said telephone apparatus base with a reflector for said beam of radiation.

7. A method as in claim 1, wherein:

provision of said beam of radiation includes reflection of said beam of radiation from said handset while said handset is in an on-hook condition on said telephone apparatus base; and said off-hook condition of said handset is signaled by interruption of said reflection of said beam of radiation from said handset by removal of said handset from said telephone apparatus base.

8. A method as in claim 7, wherein:

said reflection includes retrofitting said handset with a reflector for said beam of radiation.

9. A method as in claim 1, wherein:

said beam of radiation is a beam of infrared radiation.

10. A method as in claim 1, for telephone apparatus wherein said handset cord has a plug and said telephone apparatus has a jack for receiving said plug, said method including:

preventing eavesdropping through a microphone and an earphone of said handset of the telephone apparatus, by:

opening a circuit of one of said microphone and earphone between said plug of the cord of said handset and said jack of the telephone apparatus; and short-circuiting the other of said microphone and earphone between said plug of the cord of said handset and said jack of the telephone apparatus;

while said handset is on-hook on said base of said telephone apparatus.

11. A method as in claim 10, including:

opening a circuit of said other of said microphone and earphone during said short-circuiting.

12. A method as in claim 10, wherein:

said one of said microphone and earphone is said earphone; and said other of said microphone and said earphone is said microphone.

13. Apparatus for sensing a hook condition of a handset of a telephone apparatus including a telephone apparatus base having an inside and an outside, and conventional on-hook/off-hook circuitry inside said telephone apparatus, comprising in combination:

a transmitter of a beam of radiation retrofit to said telephone apparatus outside of said telephone apparatus;

a sensor of said beam of radiation retrofit to said telephone apparatus outside of said telephone apparatus;

a handset cord of the handset being connected to the transmitter;

a transmitter cord of the transmitter being connected to the telephone apparatus;

said handset being in said beam of radiation between said transmitter and said sensor outside of said telephone apparatus in an on-hook condition of said handset on said telephone apparatus base; and said handset being away from said beam of radiation between said transmitter and said receiver in an off-hook condition of said handset.

14. Apparatus as in claim 13, including:

a reflector for said beam of radiation between said transmitter and said sensor on one of said telephone apparatus base and said handset.

15. Apparatus as in claim 13, including:

a reflector of said beam of radiation on said telephone apparatus base between said transmitter and said sensor.

16. Apparatus as in claim 15, wherein:

said handset is between said reflector and at least one of said transmitter and said sensor in an on-hook condition of said handset on said telephone apparatus base; and said handset is remote from said reflector and from said beam of radiation between said transmitter and said sensor in an off-hook condition of said handset.

17. Apparatus as in claim 13, including:

a reflector of said beam of radiation on said handset between said transmitter and said sensor.

18. Apparatus as in claim 17, wherein:

said reflector of said beam of radiation is adapted on said handset to reflect said beam of radiation from said transmitter to said sensor in an on-hook condition of said handset on said telephone apparatus base.

19. Apparatus as in claim 18, wherein:

said reflector on said handset is out of said beam of radiation from said transmitter in an off-hook condition of said handset from said telephone apparatus base.

20. Apparatus as in claim 13, wherein:

said beam of radiation is a beam of infrared radiation, with said transmitter being an infrared beam transmitter and said sensor being on infrared beam sensor.

* * * * *